United States Patent
Hong et al.

(10) Patent No.: US 10,837,551 B2
(45) Date of Patent: Nov. 17, 2020

(54) CONTROL METHOD OF CONTINUOUSLY VARIABLE TRANSMISSIONS

(71) Applicants: Nissan Motor Co., Ltd., Kanagawa (JP); JATCO Ltd, Shizuoka (JP)

(72) Inventors: Soojung Hong, Kanagawa (JP); Kenichi Mori, Kanagawa (JP); Yutaka Kaneko, Kanagawa (JP); Kazutaka Adachi, Kanagawa (JP); Ken Okahara, Atsugi (JP); Masayuki Miyazono, Isehara (JP)

(73) Assignees: Nissan Motor Co., Ltd., Kanagawa (JP); JATCO Ltd, Shizuoka (JP)

( * ) Notice: Subject to any disclaimer, the term of this patent is extended or adjusted under 35 U.S.C. 154(b) by 0 days.

(21) Appl. No.: 16/329,610

(22) PCT Filed: Aug. 1, 2017

(86) PCT No.: PCT/JP2017/027931
§ 371 (c)(1),
(2) Date: Feb. 28, 2019

(87) PCT Pub. No.: WO2018/043005
PCT Pub. Date: Mar. 8, 2018

(65) Prior Publication Data
US 2019/0226580 A1  Jul. 25, 2019

(30) Foreign Application Priority Data

Aug. 29, 2016  (JP) .................................. 2016-166748

(51) Int. Cl.
*F16H 59/14* (2006.01)
*F16H 61/662* (2006.01)
(Continued)

(52) U.S. Cl.
CPC ........... *F16H 61/662* (2013.01); *F16H 59/14* (2013.01); *F16H 61/66259* (2013.01);
(Continued)

(58) Field of Classification Search
CPC .. F16H 61/662; F16H 61/66259; F16H 59/14; F16H 2059/704; F16H 2059/683;
(Continued)

(56) References Cited

U.S. PATENT DOCUMENTS 5,993,338 A     11/1999  Kato et al.
2008/0182713 A1*  7/2008  Asaoka ................. B60W 10/06
                                                    477/49
(Continued)

FOREIGN PATENT DOCUMENTS

JP     2002-106700 A    4/2002
JP     2004-44808 A     2/2004
(Continued)

*Primary Examiner* — David J Hlavka
(74) *Attorney, Agent, or Firm* — Osha Bergman Watanabe & Burton LLP

(57) ABSTRACT

A control method of a continuously variable transmission mounted on a vehicle includes performing advance compensation in a speed ratio control system of the continuously variable transmission, and making an advance amount according to a vibration frequency of torsional vibration of an input shaft of the continuously variable transmission which is the advance amount of the advance compensation variable in accordance with an operation state of the vehicle. A feedback gain of speed ratio control of the continuously variable transmission performed in the speed ratio control system is variable in accordance with an operation state of the vehicle. When the advance amount is made variable, the advance amount is made variable in accordance with the feedback gain.

7 Claims, 7 Drawing Sheets

(51) Int. Cl.
  *F16H 59/42*  (2006.01)
  *F16H 59/70*  (2006.01)
  *F16H 59/72*  (2006.01)
  *F16H 59/68*  (2006.01)

(52) U.S. Cl.
  CPC .............. *F16H 59/42* (2013.01); *F16H 59/70* (2013.01); *F16H 59/72* (2013.01); *F16H 2059/148* (2013.01); *F16H 2059/683* (2013.01); *F16H 2059/704* (2013.01)

(58) Field of Classification Search
  CPC .... F16H 2059/148; F16H 59/72; F16H 59/70; F16H 59/42
  See application file for complete search history.

(56) References Cited

U.S. PATENT DOCUMENTS

2008/0183357 A1\* 7/2008 Asaoka ................ F16H 63/062
    701/51
2016/0281847 A1\* 9/2016 Kanayama ............ F16H 63/065

FOREIGN PATENT DOCUMENTS

| JP | 2004-360725 A | 12/2004 |
| JP | 2010-274822 A | 12/2010 |
| JP | 2011-207240 A | 10/2011 |

\* cited by examiner

CONTROL METHOD OF CONTINUOUSLY VARIABLE TRANSMISSIONS

CROSS-REFERENCE TO RELATED APPLICATIONS

The present application is a national stage application of PCT/JP2017/027931 filed Aug. 1, 2017, and claims priority to Japanese Patent Application No. 2016-166748 filed with the Japan Patent Office on Aug. 29, 2016, all the contents of which are hereby incorporated by reference in their entirety.

BACKGROUND

Technical Field

The present invention relates to a control method of a continuously variable transmission.

Related Art

With regard to shift control of a continuously variable transmission, JP2002-106700A discloses an art of advance compensation of a target speed ratio for a response delay portion of an actual speed ratio to the target speed ratio.

SUMMARY OF INVENTION

In the continuously variable transmission, longitudinal vibration which causes a swing in a longitudinal direction by a resonant frequency of a power train can occur in some cases. The longitudinal vibration is considered to occur by linkage between torque fluctuation and a shift of the continuously variable transmission when stability of the speed ratio of the continuously variable transmission is smaller than the torque fluctuation of the power train.

Thus, the longitudinal vibration is considered to be suppressed by improving stability of a speed ratio of the continuously variable transmission through advance compensation, that is, damping performances. With regard to the advance compensation, the advance compensation can be performed by fixing an advance amount at a peak value frequency. The peak value frequency is a frequency at which the advance amount corresponding to the frequency indicates a peak.

However, in this case, there is a concern that the advance amount is not sufficient depending on an operation state of a vehicle, and a sufficient damping effect cannot be obtained. On the other hand, in the advance compensation, if the advance amount is made large, a gain of a high frequency also becomes large, and there is a concern that a speed ratio control system becomes unstable if the advance amount is made too large. Moreover, the stability of the speed ratio control system can be different depending on the operation state of the vehicle.

Thus, in performing the advance compensation, an art capable of obtaining the damping effect while the stability of the speed ratio control system is ensured is in demand.

One or more embodiments of the present invention provides a control method of a continuously variable transmission capable of obtaining the damping effect while the stability of the speed ratio control system is ensured in performing the advance compensation.

A control method of a continuously variable transmission according to one or more embodiments of the present invention is a control method of a continuously variable transmission mounted on a vehicle. The control method of the continuously variable transmission includes performing of advance compensation in a speed ratio control system of the continuously variable transmission, and making of an advance amount according to a vibration frequency of torsional vibration of an input shaft of the continuously variable transmission which is the advance amount of the advance compensation variable in accordance with an operation state of the vehicle.

DETAILED DESCRIPTION

Embodiments of the present invention will be described below by referring to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
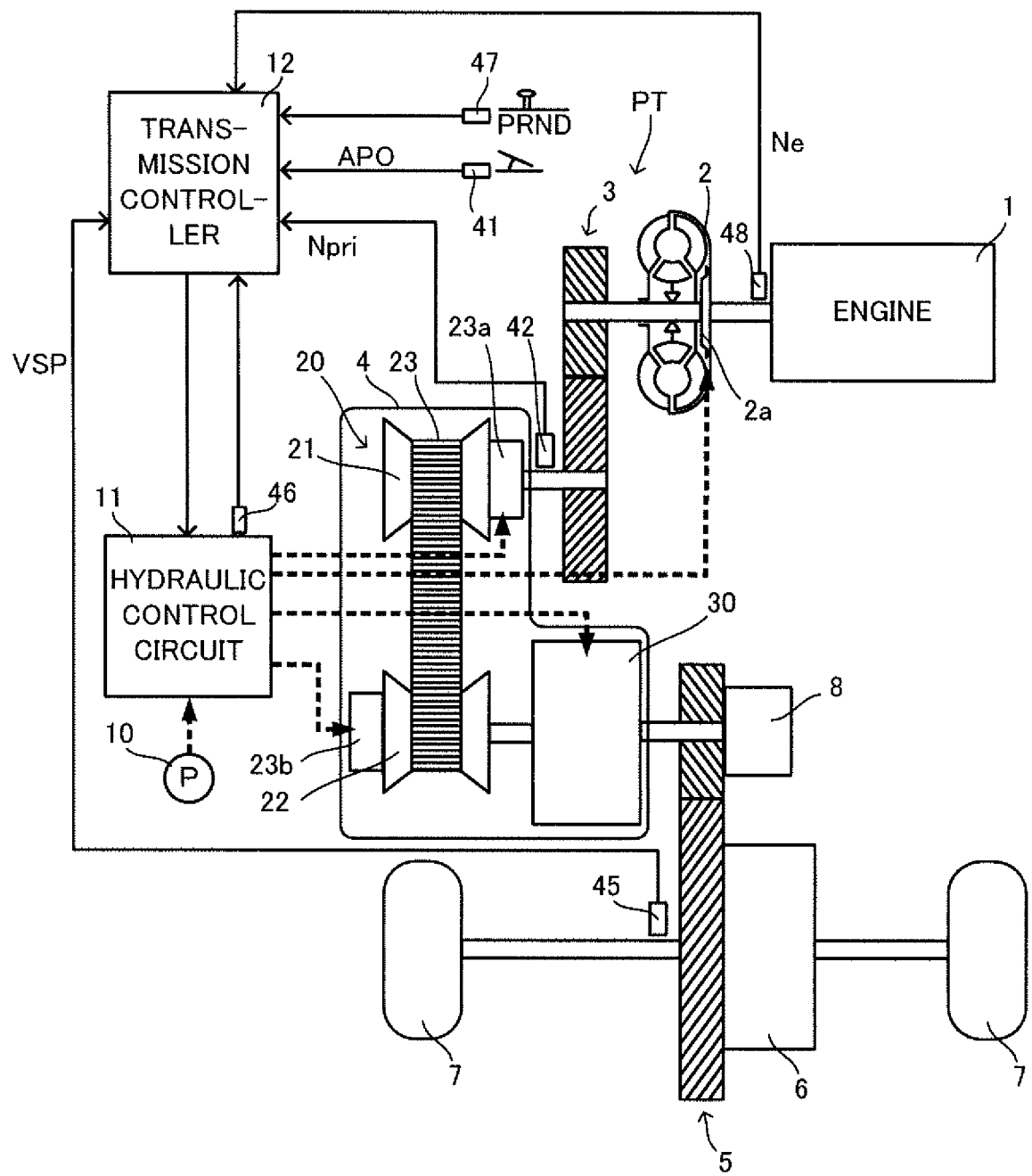
FIG. 1 is a schematic configuration diagram of a vehicle including a transmission controller.

FIG. 1 is a schematic configuration diagram of a vehicle including a transmission controller 12. The vehicle includes an engine 1 as a power source. The power of the engine 1 is transmitted to a driving wheel 7 through a torque converter 2, a first gear train 3, a transmission 4, a second gear train (final gear) 5, and a differential device 6 which constitute a power train PT. In the second gear train 5, a parking mechanism 8 adapted to mechanically lock an output shaft of the transmission 4 unable to be rotated during parking is provided.

The torque converter 2 includes a lockup clutch 2a. When the lockup clutch 2a is engaged, slip does not occur any more in the torque converter 2, and transmission efficiency of the torque converter 2 is improved. In the following, the lockup clutch 2a is referred to as the LU clutch 2a.

The transmission 4 is a continuously variable transmission including a variator 20. The variator 20 is a continuously variable transmission mechanism including a pulley 21 which is a primary pulley, a pulley 22 which is a secondary pulley, and a belt 23 extended between the pulleys 21 and 22. The pulley 21 constitutes a driving side rotation element and the pulley 22 constitutes a driven side rotation element.

Each of the pulleys 21 and 22 includes a fixed conical plate, a movable conical plate arranged in a state where a sieve surface is faced with the fixed conical plate and a V-groove is formed with the fixed conical plate, and a hydraulic cylinder provided on a rear surface of the movable conical plate and adapted to displace the movable conical plate in an axial direction. The pulley 21 includes a hydraulic cylinder 23a as a hydraulic cylinder, and the pulley 22 includes a hydraulic cylinder 23b as a hydraulic cylinder.

When a hydraulic pressure to be supplied to the hydraulic cylinders 23a and 23b is adjusted a width of the V-groove is changed, a contact radius between the belt 23 and each of the pulleys 21 and 22 is changed, and a speed ratio of the variator 20 is changed continuously. The variator 20 may be a toroidal continuously variable transmission mechanism.

The transmission 4 further includes a sub-transmission mechanism 30. The sub-transmission mechanism 30 is a forward 2-position/reverse 1-position transmission mechanism and has a first speed and a second speed having a speed ratio smaller than that of the first speed as the forward gear positions. The sub-transmission mechanism 30 is provided in series with the variator 20 in a power transmission path from the engine 1 to the driving wheel 7.

The sub-transmission mechanism 30 may be directly connected to the output shaft of the variator 20 as in this example or may be connected through a power transmission mechanism such as another transmission and a gear train. Alternatively, the sub-transmission mechanism 30 may be connected to an input shaft side of the variator 20.

In the vehicle, an oil pump 10 driven by using a part of the power of the engine 1, a hydraulic control circuit 11 adapted to adjust and to supply the hydraulic pressure generated by the oil pump 10 through oil supply to each portion of the transmission 4, and the transmission controller 12 adapted to control the hydraulic control circuit 11 are provided.

The hydraulic control circuit 11 is constituted by a plurality of channels and a plurality of hydraulic control valves. The hydraulic control circuit 11 controls the plurality of hydraulic control valves and switches a hydraulic supply path on the basis of a transmission control signal from the transmission controller 12. Moreover, the hydraulic control circuit 11 adjusts a required hydraulic pressure from the hydraulic pressure generated by the oil pump 10 through the oil supply and supplies the adjusted hydraulic pressure to each portion of the transmission 4. As a result, a shift of the variator 20, a change of a gear position in the sub-transmission mechanism 30, and engagement/disengagement of the LU clutch 2a are performed.

Figure 2:
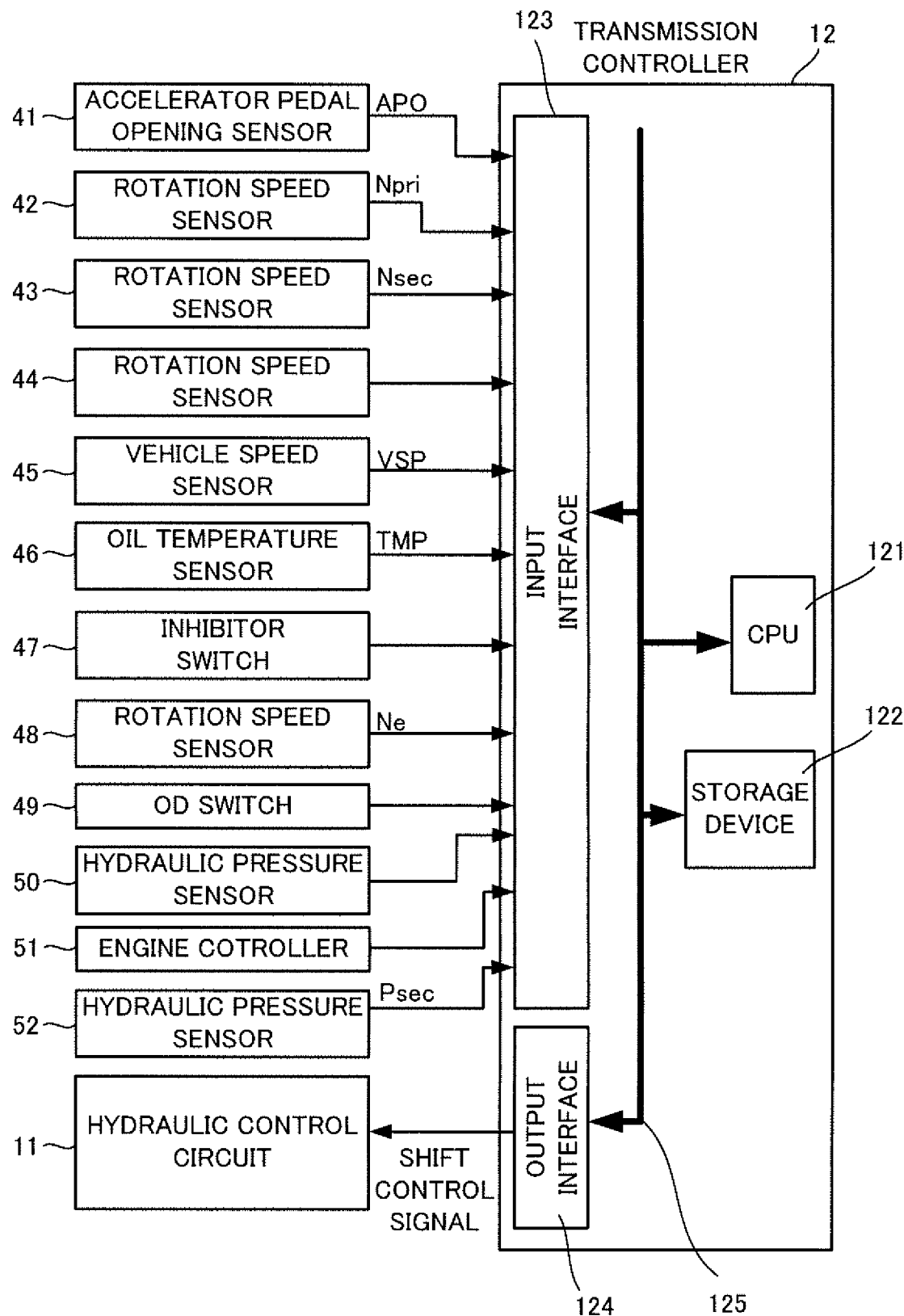
FIG. 2 is a schematic configuration diagram of the transmission controller.

FIG. 2 is a schematic configuration diagram of the transmission controller 12. The transmission controller 12 is constituted by a CPU 121, a storage device 122 constituted of a RAM/ROM, an input interface 123, an output interface 124, and a bus 125 mutually connecting them.

An output signal of an accelerator pedal opening sensor 41 adapted to detect an accelerator pedal opening APO indicating an operation amount of an accelerator pedal, an output signal of a rotation speed sensor 42 adapted to detect an input-side rotation speed of the transmission 4, an output signal of a rotation speed sensor 43 adapted to detect a rotation speed Nsec of the pulley 22, and an output signal of a rotation speed sensor 44 adapted to detect an output-side rotation speed of the transmission 4, for example, are input into the input interface 123.

The input-side rotation speed of the transmission 4 is specifically a rotation speed of an input shaft of the transmission 4, that is, a rotation speed Npri of the pulley 21. The output-side rotation speed of the transmission 4 is specifically a rotation speed of the output shaft of the transmission 4, that is, a rotation speed of the output shaft of the sub-transmission mechanism 30. The input-side rotation speed of the transmission 4 may be a rotation speed at a position having a gear train or the like held between that and the transmission 4 such as a turbine rotation speed of the torque converter 2, for example. The same applies to the output-side rotation speed of the transmission 4.

An output signal of a vehicle speed sensor 45 adapted to detect a vehicle speed VSP, an output signal of an oil temperature sensor 46 adapted to detect an oil temperature TMP of the transmission 4, an output signal of an inhibitor switch 47 adapted to detect a position of a select lever, an output signal of a rotation speed sensor 48 adapted to detect a rotation speed Ne of the engine 1, an output signal of an OD switch 49 which enlarges a shift range of the transmission 4 to a speed ratio smaller than 1, an output signal of a hydraulic pressure sensor 50 adapted to detect a supply hydraulic pressure to the LU clutch 2a, a hydraulic pressure sensor 52 adapted to detect a secondary pressure Psec which is a supply hydraulic pressure to the pulley 22 and the like are further input into the input interface 123. A torque signal of an engine torque Te is also input into the input interface 123 from an engine controller 51 provided in the engine 1.

In the storage device 122, a shift control program of the transmission 4, various maps used in the shift control program and the like are stored. The CPU 121 reads and executes the shift control program stored in the storage device 122 and generates a shift control signal on the basis of various signals input through the input interface 123. Moreover, the CPU 121 outputs a generated shift control signal to the hydraulic control circuit 11 through the output interface 124. Various values used by the CPU 121 in calculation processing and calculation results of the CPU 121 are stored in the storage device 122 as appropriate.

In the transmission 4, longitudinal vibration can occur at a PT resonant frequency Fpt which is a resonant frequency of the power train PT. The longitudinal vibration is considered to occur due to linkage between the torque fluctuation and a shift of the transmission 4 when stability of the speed ratio of the transmission 4 is insufficient with respect to the torque fluctuation of the power train PT. Thus, the longitudinal vibration is considered to be suppressed by improving the stability of the speed ratio of the transmission 4, that is, damping through performance of advance compensation.

However, there is a concern that the damping effect by the advance compensation is reduced as will be described below depending on a running state of the vehicle.

Figure 3:
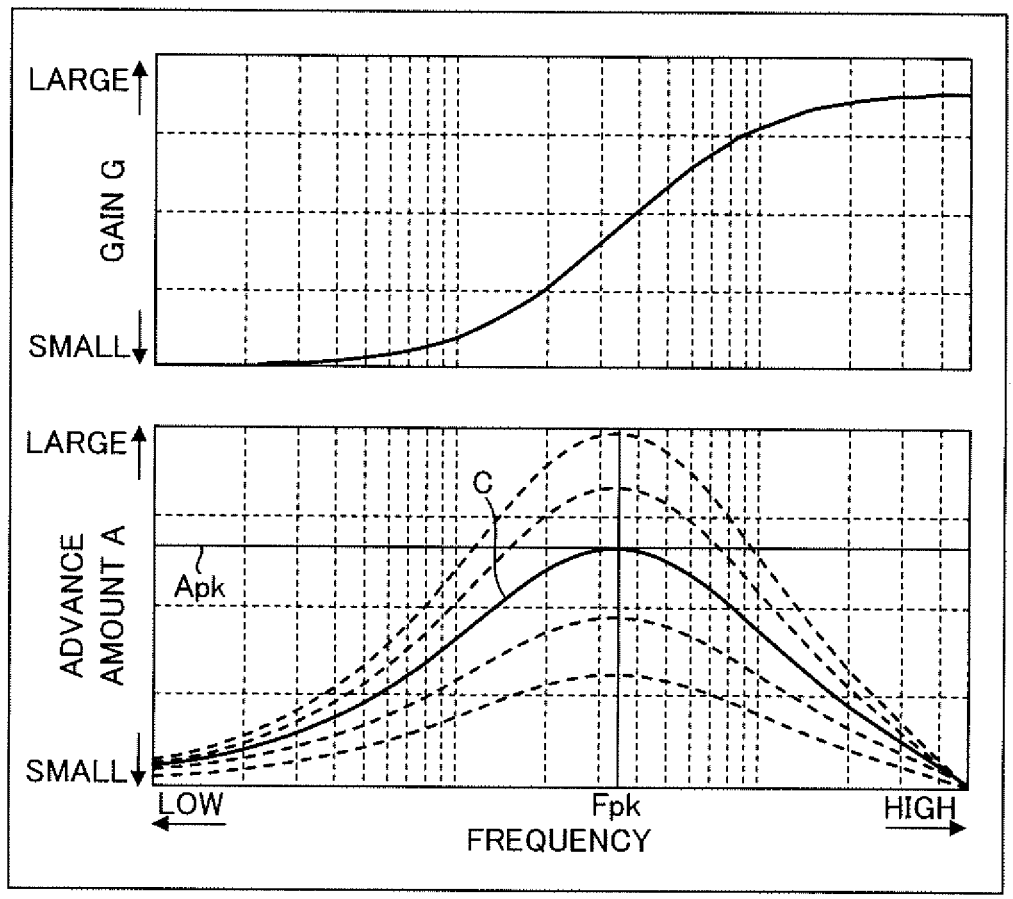
FIG. 3 is a view illustrating an example of a Bode diagram of a phase advance compensator.

FIG. 3 is a view illustrating an example of a Bode diagram of a phase advance compensator. A lateral axis of the Bode diagram indicates a frequency by logarithm. In FIG. 3, a case of secondary phase advance compensation is illustrated. A peak value frequency Fpk is a frequency at which an advance amount A according to the frequency indicates a peak and is set in accordance with a targeted frequency in the phase advance compensation. The targeted frequency is specifically the PT resonant frequency Fpt. Thus, the peak value frequency Fpk is set to the PT resonant frequency Fpt, for example. An advance amount Apk indicates the advance amount A according to the peak value frequency Fpk.

A curve C illustrates an example of the advance amount A according to the frequency. The advance amount A according to the frequency is the advance amount A of the phase advance compensation and is the advance amount A according to a vibration frequency of torsional vibration of the input shaft of the transmission 4. The advance amount A according to the frequency may be also grasped as the advance amount A corresponding to a certain frequency such as the PT resonant frequency Fpt, for example, in the curve C. In FIG. 3, a gain corresponding to the curve C is illustrated as a gain G.

Here, in suppression of the longitudinal vibration, the phase advance compensation can be performed by fixing the advance amount Apk at the peak value frequency Fpk as the phase advance compensation. In other words, the phase advance compensation can be performed by fixing the advance amount A according to the frequency to the curve C, for example. However, in this case, there is a concern that depending on the operation state of the vehicle, the advance amount A runs short and the sufficient damping effect cannot be obtained.

On the other hand, the more the advance amount Apk of the peak value frequency Fpk increases, the larger the damping effect tends to be. Thus, the advance amount A according to the frequency can be made variable as indicated by a broken line in FIG. 3 in accordance with the operation state of the vehicle. Specifically, the advance amount Apk can be made variable in accordance with the operation state of the vehicle.

However, when the advance amount Apk is increased, the gain G is also increased. Thus, if the advance amount Apk is made too large, there is a concern that a speed ratio control system 100 which will be described later becomes unstable. Moreover, stability of the speed ratio control system 100 can be different depending on the operation state of the vehicle.

In view of the circumstances described above, the transmission controller 12 performs shift control as will be described below. In the following, a speed ratio Ratio of the variator 20 will be used in description as the speed ratio of the transmission 4. The speed ratio Ratio is a collective name of the speed ratio of the variator 20 including an actual speed ratio Ratio_A, a target speed ratio Ratio_D, and a reached speed ratio Ratio_T which will be described later and includes at least any one of them. The same applies to a primary pressure Ppri which is a supply hydraulic pressure to the pulley 21 and the secondary pressure Psec. The speed ratio of the transmission 4 may be a through speed ratio which is a speed ratio of the variator 20 and the sub-transmission mechanism 30 as a whole. In the following, the transmission controller 12 will be referred to simply as the controller 12.

Figure 4:
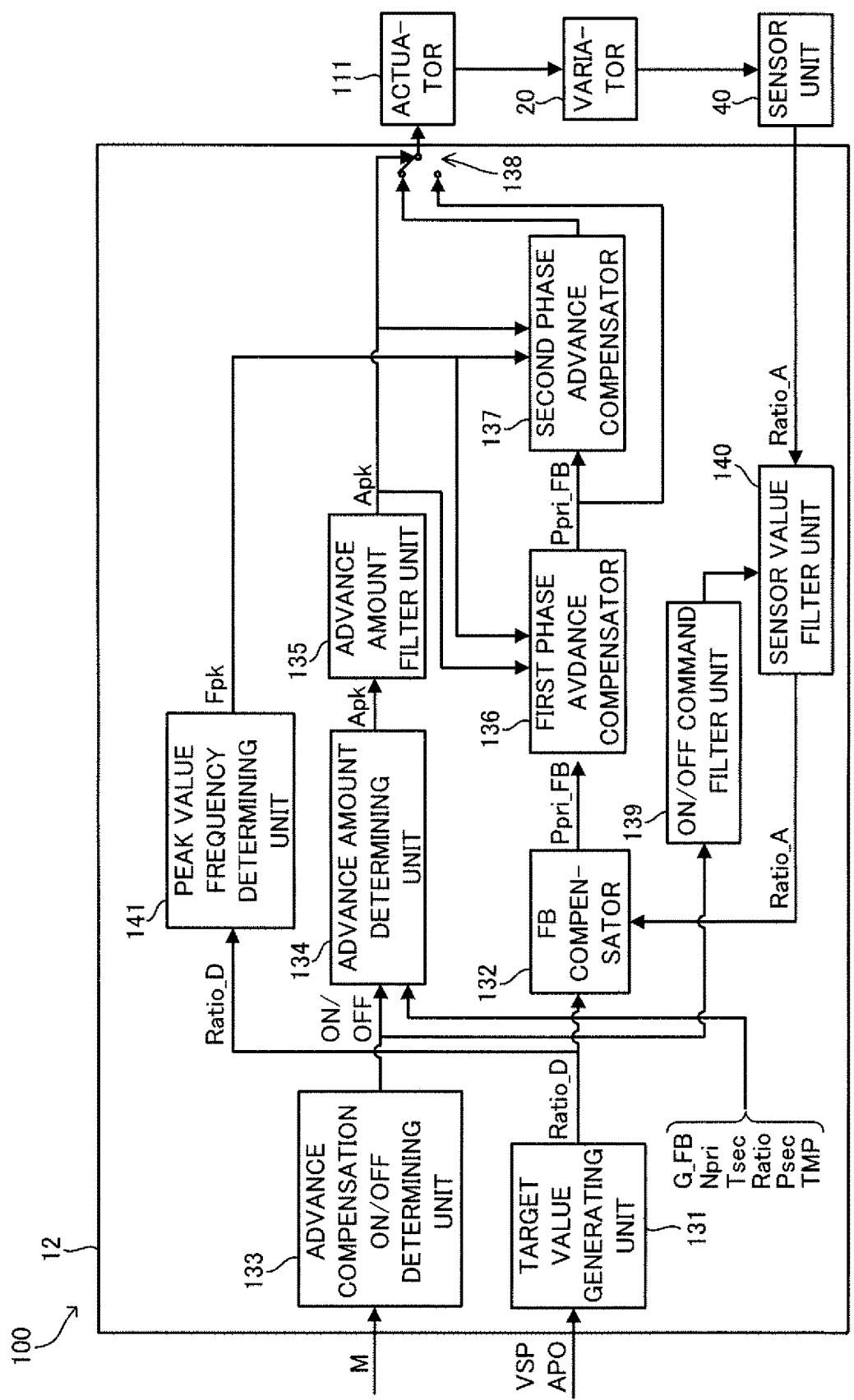
FIG. 4 is a view illustrating an example of a block diagram illustrating an essential part of a speed ratio control system.

FIG. 4 is a view illustrating an example of a block diagram illustrating an essential part of the speed ratio control system 100. The speed ratio control system 100 performs feedback speed ratio control of the transmission 4 by executing the speed ratio control of the transmission 4 so that the actual shift control value becomes the target shift control value. The speed ratio control system 100 is constituted by the controller 12, an actuator 111, and the variator 20.

The controller 12 has a target value generating unit 131, an FB compensator 132, an advance compensation on/off determining unit 133, an advance amount determining unit 134, an advance amount filter unit 135, a first phase advance compensator 136, a second phase advance compensator 137, a switch unit 138, an on/off command filter unit 139, a sensor value filter unit 140, and a peak value frequency determining unit 141. The FB is an abbreviation of feedback.

The target value generating unit 131 generates a target value of the shift control. The target value is specifically a target speed ratio Ratio_D based on the reached speed ratio Ratio_T which is a final target shift control value with the speed ratio Ratio as a shift control value. The shift control value may be the primary pressure Ppri as a control parameter, for example.

The reached speed ratio Ratio_T is set in advance in accordance with the operation state of the vehicle in a shift map. Thus, the target value generating unit 131 reads the corresponding reached speed ratio Ratio_T from the shift map on the basis of the detected operation state. The operation state of the vehicle is specifically the vehicle speed VSP and an accelerator pedal opening APO.

The target value generating unit 131 calculates the target speed ratio Ratio_D on the basis of the reached speed ratio Ratio_T. The target speed ratio Ratio_D is a transitional target speed ratio until it becomes the reached speed ratio Ratio_T and constitutes the target shift control value. The calculated target speed ratio Ratio_D is input into the FB compensator 132.

The FB compensator 132 calculates a feedback command value on the basis of the actual speed ratio Ratio_A which is an actual value of the speed ratio Ratio and the target speed ratio Ratio_D. The feedback command value is a feedback primary instructed pressure Ppri_FB for filling an error between the actual speed ratio Ratio_A and the target speed ratio Ratio_D, for example.

In the FB compensator 132, an FB gain G_FB is made variable. The FB gain G_FB is an FB gain of the speed ratio control of the transmission 4 performed in the speed ratio control system 100 and is made variable in accordance with the operation state of the vehicle. The operation state of the vehicle is the speed ratio Ratio, a change rate α of the speed ratio Ratio, an input torque Tpri and the like, for example. The change rate α of the speed ratio Ratio is a shift speed in other words. The feedback command value (feedback primary instructed pressure Ppri_FB) calculated by the FB compensator 132 is input into the first phase advance compensator 136.

The advance compensation on/off determining unit 133 determines on/off of the phase advance compensation of the feedback primary instructed pressure Ppri_FB. The advance compensation on/off determining unit 133 determines on/off of the phase advance compensation in accordance with a pulley state value M. The pulley state value M is a value for determining whether the pulleys 21 and 22 are in a state where the longitudinal vibration occurs or not and includes the rotation speed Npri, an input torque Tsec to the pulley 22, the speed ratio Ratio, and the change rate α of the speed ratio Ratio.

The input torque Tsec can be calculated as a value obtained by multiplying a speed ratio set between the engine 1 and the pulley 22, thus a gear ratio of the first gear train 3 and the speed ratio of the variator 20 in one or more embodiments of the present invention, by the engine torque Te. The actual speed ratio Ratio_A and the target speed ratio Ratio_D can be applied to the speed ratio Ratio. The speed ratio Ratio may be the actual speed ratio Ratio_A or the target speed ratio Ratio_D.

The advance compensation on/off determining unit 133 specifically determines on/off of the phase advance compensation of the feedback primary instructed pressure Ppri_FB in accordance with all the four parameters of the rotation speed Npri, the input torque Tsec, the speed ratio Ratio, and the change rate α. The advance compensation on/off determining unit 133 may be configured to determine on/off of the phase advance compensation in accordance with at least any one of the parameters of the input torque Tsec, the speed ratio Ratio, and the change rate α.

The advance compensation on/off determining unit 133 determines on/off of the phase advance compensation of the feedback primary instructed pressure Ppri_FB in accordance with an engagement state of the LU clutch 2a, a state of a driver operation to the transmission 4, and presence of a failure in addition to the pulley state value M.

Figure 5:
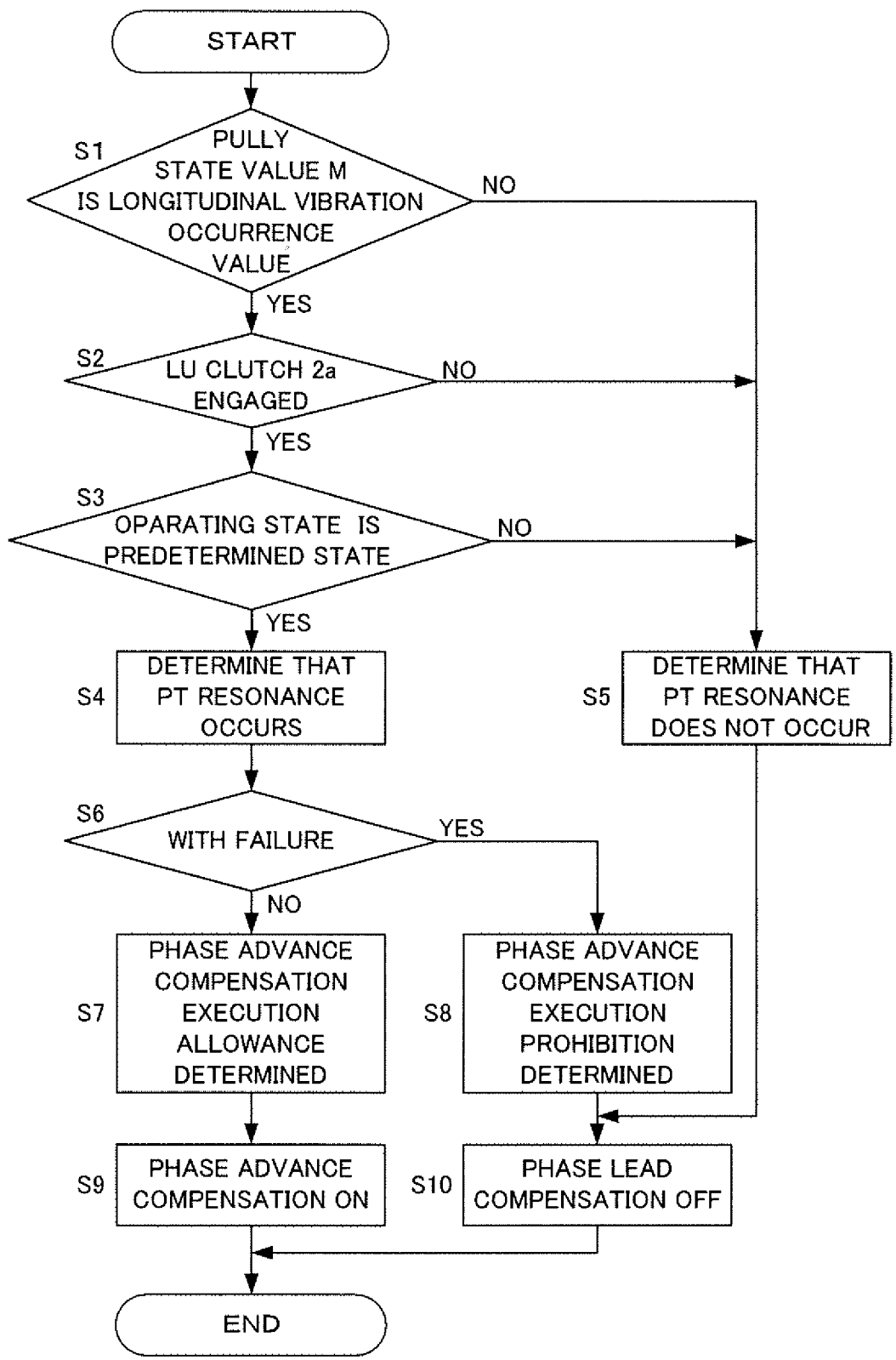
FIG. 5 is a view illustrating an example of control executed by the transmission controller in a flowchart.

FIG. 5 is a view illustrating an example of processing executed by the controller 12 in a flowchart. The processing of the flowchart is specifically executed by the advance compensation on/off determining unit 133.

The processing from Step S1 to Step S5 is processing for determining whether resonance of the power train PT occurs or not or in other words, processing for determining whether the longitudinal vibration of the transmission 4 occurs or not. In the following, resonance of the power train PT is referred to as PT resonance.

At Step S1, the controller 12 determines whether the pulley state value M is a value which causes the longitudinal vibration to occur or not. That is, at Step S1, it is determined whether the states of the pulleys 21 and 22 are states where the longitudinal vibration occurs or not. At Step S1, the controller 12 specifically makes the following determination for each of the rotation speed Npri, the input torque Tsec, the speed ratio Ratio, and the change rate α of the speed ratio Ratio which are the pulley state values M.

With regard to the rotation speed Npri and the input torque Tsec, the controller 12 determines whether operation points according to the rotation speed Npri and the input torque Tsec are within a determination region specified in accordance with them or not. When the operation point is within the determination region, the controller 12 determines that the rotation speed Npri and the input torque Tsec are both longitudinal vibration occurrence values. When the operation point is within the determination region, it is in other words, a state where the pulleys 21 and 22 are susceptible to disturbance, that is, when stability of the speed ratio Ratio is insufficient. The determination region can be set in advance by experiments and the like.

With regard to the speed ratio Ratio, if the speed ratio Ratio is larger than a predetermined speed ratio Ratio1 or in other words, if the speed ratio is closer to a Low side than the predetermined speed ratio Ratio1, the controller determines that the speed ratio Ratio is the longitudinal vibration occurrence value. The predetermined speed ratio Ratio1 is a value for specifying the speed ratio at which the longitudinal vibration occurs and it is 1, for example. The predetermined speed ratio Ratio1 can be set in advance by an experiment or the like.

With regard to the change rate α, if the change rate α of the speed ratio Ratio is smaller than a predetermined value α1, the controller 12 determines that the change rate α is the longitudinal vibration occurrence value. The predetermined value α1 is a value for specifying the change rate α at which the longitudinal vibration occurs, and if the change rate α is smaller than the predetermined value α1, it corresponds to a case where the speed ratio Ratio is in a steady state. The predetermined value α1 can be set in advance by an experiment or the like.

At Step S1, if it is determined that all these pulley state values M are longitudinal vibration occurrence values, the controller 12 makes affirmative determination, and if it is determined that any one of these pulley state values M is not the longitudinal vibration occurrence value, the controller 12 makes negative determination.

In the case of the negative determination at Step S1, the processing goes onto Step S5, and the controller 12 determines that the PT resonance does not occur. Therefore, it is determined that the longitudinal vibration does not occur. In this case, the processing goes on to Step S10, and the controller 12 turns off the phase advance compensation. Subsequently to Step S10, the processing in this flowchart is finished.

In the case of the affirmative determination at Step S1, the processing goes on to Step S2, and the controller 12 determines whether the LU clutch 2a has been engaged or not. As a result, on/off of the phase advance compensation is determined in accordance with the engagement state of the LU clutch 2a.

In the case of the negative determination at Step S2, since the LU clutch 2a is not engaged, it is determined that the longitudinal vibration does not occur. In this case, the processing goes on to Step S5. If it is affirmative determination at Step S2, the state of the LU clutch 2a is determined to be a state where the longitudinal vibration occurs. In this case, the processing goes on to Step S3.

At Step S3, the controller 12 determines whether a state of the driver operation to the transmission 4 is a predetermined state or not. The predetermined state includes at least either one of a first operation state in which the speed ratio Ratio is larger than the predetermined speed ratio Ratio1 and a second operation state in which the speed ratio Ratio is in a steady state.

The first operation state is a state where the OD switch 49 is in an OFF state, for example. The second operation state is a state in which the speed ratio Ratio is fixed by the driver operation such as a state in which a manual range is selected by the select lever and a state in which a manual mode such as a sports mode is selected.

It can be determined that the speed ratio Ratio continuously becomes larger than the predetermined speed ratio Ratio1 or that the speed ratio Ratio is continuously in the steady state by determining whether the driver operation state is the predetermined state or not. Therefore, the fact that the speed ratio Ratio is in the state where the longitudinal vibration occurs can be determined more reliably.

In the case of the negative determination at Step S3, the driver operation state is not the predetermined state and thus, it is determined that the longitudinal vibration does not occur. In this case, the processing goes on to Step S5. In the case of the affirmative determination at Step S3, the processing goes on to Step S4.

At Step S4, the controller 12 determines that the PT resonance occurs. Therefore, it is determined that the longitudinal vibration occurs. Subsequently to Step S4, the processing goes on to Step S6.

From Step S6 to Step S8, determination is made on whether the phase advance compensation can be turned on or not. In other words, availability of execution of the phase advance compensation is determined.

At Step S6, the controller 12 determines whether or not there is a failure. The failure can be a failure in the transmission 4 including the failure in the hydraulic control circuit 11 used for the shift control of the transmission 4 and sensors/switches. The failure may be a failure of the vehicle including a failure in the transmission 4.

In the case of the affirmative determination at Step S6, the processing goes on to Step S8, and the controller 12 determines that the phase advance compensation should not be turned on. That is, execution prohibition determination is made on the phase advance compensation. Subsequently to Step S8, the processing goes on to Step S10.

In the case of the negative determination at Step S6, the processing goes on to Step S7, and the controller 12 determines that the phase advance compensation can be turned on. That is, execution allowance determination is made on the phase advance compensation. In this case, the processing goes on to Step S9, and the controller 12 turns on the phase advance compensation. Subsequently to Step S9, the processing in this flowchart is finished.

Returning to FIG. 4, the advance compensation on/off determining unit 133 outputs an on command when turning on of the phase advance compensation is determined, and outputs an off command when turning off of the phase advance compensation is determined. The on/off command is input from the advance compensation on/off determining unit 133 to the advance amount determining unit 134 and the on/off command filter unit 139.

The advance amount determining unit 134 determines the advance amount Apk. The advance amount determining unit 134 is provided on a slipstream of the advance compensation on/off determining unit 133. The advance amount determining unit 134 is provided as above in view of arrangement in a signal path. The advance amount determining unit 134 determines the advance amount Apk in accordance with the on/off command or in other words, in accordance with the determination of on/off of the phase advance compensation. The advance amount determining unit 134 determines that the advance amount Apk is zero when the off command is input.

The advance amount determining unit 134 determines the advance amount Apk in accordance with the operation state of the vehicle when the on command is input. The FB gain G_FB, the rotation speed Npri, the input torque Tsec, the speed ratio Ratio, the secondary pressure Psec, and the oil temperature TMP are input into the advance amount determining unit 134 as parameters indicating the operation state of the vehicle.

The advance amount determining unit 134 makes the advance amount Apk variable in accordance with the operation state of the vehicle by determining the advance amount Apk in accordance with these plurality of parameters. The advance amount determining unit 134 may make the advance amount Apk variable in accordance with the operation state of the vehicle by determining the advance amount Apk in accordance with at least any one of these plurality of parameters.

Figure 6:
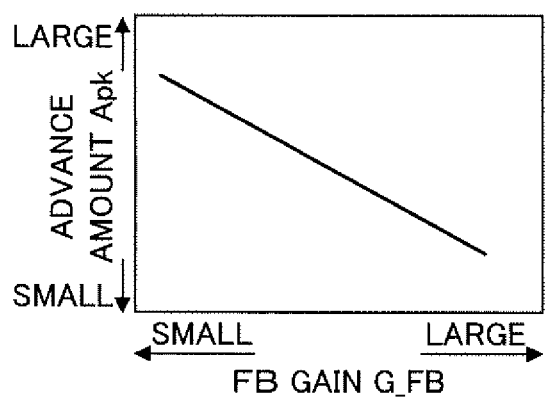
FIG. 6 is a view illustrating a setting example of an advance amount according to a feedback gain.

FIG. 6 is a view illustrating a setting example of the advance amount Apk according to the FB gain G_FB. In FIG. 6, a setting tendency of the advance amount Apk according to the FB gain G_FB is illustrated. The same applies to FIGS. 7 to 11 which will be described later. Here, when the FB gain G_FB is small, stability of the speed ratio control system 100 can be considered to be relatively ensured. Thus, the smaller the FB gain G_FB is, the larger the advance amount Apk is made larger so that a maximum vibration suppression effect can be obtained in view of the stability of the speed ratio control system 100 changing in accordance with the FB gain G_FB.

Figure 7:
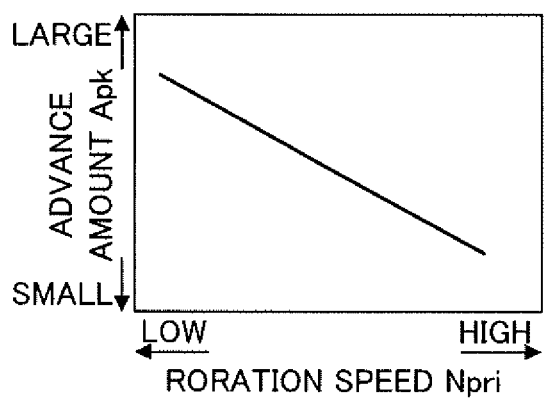
FIG. 7 is a view illustrating a setting example of the advance amount according to a rotation speed of a primary pulley.

FIG. 7 is a view illustrating a setting example of the advance amount Apk according to the rotation speed Npri. For the rotation speed Npri, the rotation speed Npri detected on the basis of the output of the rotation speed sensor 42 can be used. For the rotation speed Npri, a value obtained by multiplying the rotation speed Nsec detected on the basis of the output of the rotation speed sensor 43 with the speed ratio Ratio may be also used.

Here, if the rotation speed Npri is low, even if the primary pressure Ppri with the same magnitude is supplied, shift responsiveness becomes lower than a case where the rotation speed Npri is high. Thus, the lower the rotation speed Npri is, the larger the advance amount Apk is made so that the maximum vibration suppression effect can be obtained in view of the shift responsiveness changing in accordance with the rotation speed Npri.

Here, the longitudinal vibration is larger in a region where the input torque Tsec is negative than in the region where it is positive.

Thus, the advance amount Apk is made larger in the region where the input torque Tsec is negative than in the region where it is positive. As a result, the maximum vibration suppression effect can be obtained to the longitudinal vibration in the region where the input torque Tsec is negative.

In the region where the input torque Tsec is positive, the vibration is promoted as the stability of the speed ratio control system 100 in the high torque region lowers. Thus, in the region where the input torque Tsec is positive, the advance amount Apk can be made smaller in the high torque region than in the low torque region where the input torque is smaller than that in the high torque region. In this case, promotion of the vibration as the stability of the speed ratio control system 100 lowers can be prevented or suppressed.

As described above, the smaller the input torque Tsec becomes, the larger the advance amount Apk can be made both in the region where the input torque is positive and in the region where it is negative.

Figure 8:
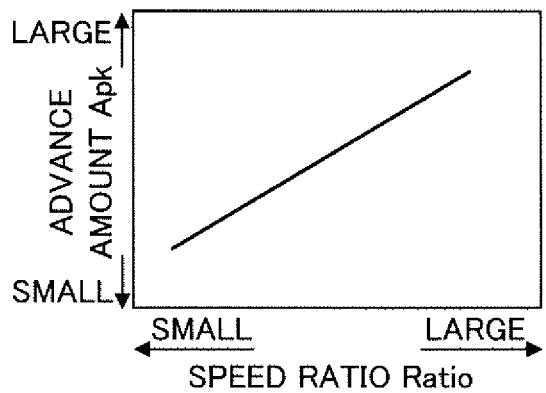
FIG. 8 is a view illustrating a setting example of the advance amount according to a speed ratio.

FIG. 8 is a view illustrating a setting example of the advance amount Apk according to the speed ratio Ratio. For the speed ratio Ratio, the actual speed ratio Ratio_A can be used. For the speed ratio Ratio, the target speed ratio Ratio_D may be used.

Here, the larger the speed ratio Ratio is, the larger the longitudinal vibration becomes, but it is experimentally confirmed that the larger the advance amount Apk is made, the more the longitudinal vibration is reduced. Thus, the larger the speed ratio Ratio is made, the larger the advance amount Apk is made so that the sufficient vibration suppression effect can be obtained even in the state where the speed ratio Ratio is large.

Figure 9:
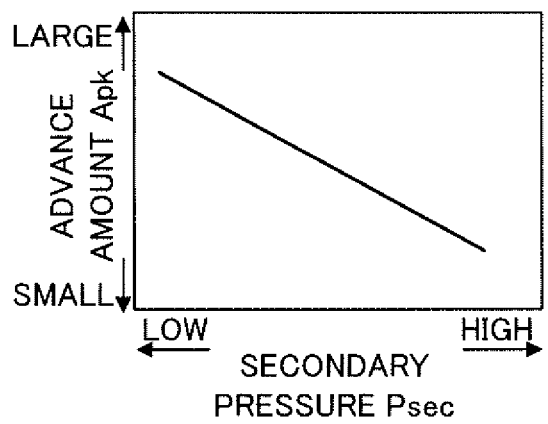
FIG. 9 is a view illustrating a setting example of the advance amount according to a secondary pressure.

FIG. 9 is a view illustrating a setting example of the advance amount Apk according to the secondary pressure Psec. For the secondary pressure Psec, the secondary pressure Psec detected on the basis of the output of the hydraulic pressure sensor 52 can be used. For the secondary pressure Psec, the instructed pressure Psec_D of the secondary pressure Psec may be also used. The instructed pressure Psec_D can be calculated on the basis of the input torque Tsec, for example.

Here, in a state where the secondary pressure Psec is a low pressure, friction of the belt 23 becomes small, and fluctuation can easily occur in the speed ratio Ratio, and there is a concern that the longitudinal vibration becomes larger. Thus, the smaller the secondary pressure Psec is, the larger the advance amount Apk is made so that the maximum vibration suppression effect can be obtained against such concern.

Figure 10:
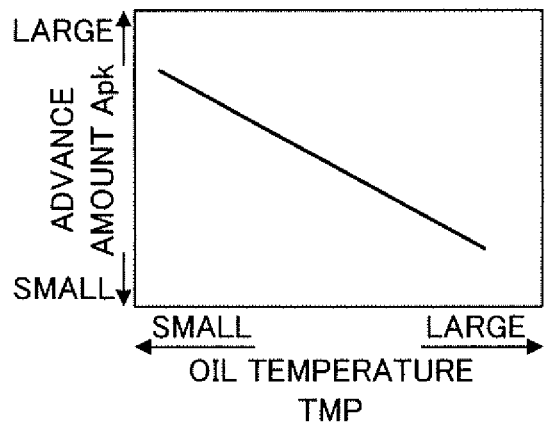
FIG. 10 is a view illustrating a setting example of the advance amount according to an oil temperature of a continuously variable transmission.

FIG. 10 is a view illustrating a setting example of the advance amount Apk according to the oil temperature TMP. Here, if the oil temperature TMP is a low temperature, the hydraulic pressure responsiveness becomes low and thus, it takes time to perform required compensation. Therefore, the compensation cannot be performed at appropriate timing and there is a concern that an original damping effect cannot be obtained. Thus, the lower the oil temperature TMP becomes, the larger the advance amount Apk is made so that the maximum vibration suppression effect can be obtained against such concern.

In the advance amount determining unit 134, the advance amount Apk is made variable in accordance with the operation state by determining the advance amount Apk according to each parameter on the basis of the setting as illustrated in FIGS. 6 to 10, whereby the advance amount A at a targeted frequency is adjusted.

When the advance amount Apk is to be increased in accordance with each parameter on the basis of the setting as illustrated in FIGS. 6 to 10, the advance amount Apk is limited to a range in which stable operation is possible by considering a relationship with a specific specification of the speed ratio control system 100 such as the variator 20. A limit amount for limiting the advance amount Apk to such a range can be acquired in advance by calculation or by an experiment as a limit amount according to each parameter. The advance amount Apk is actually determined by further decreasing the advance amount Apk determined in accordance with each parameter for a portion of the limit amount set in accordance with each parameter.

In the advance amount determining unit 134, a first advance amount Apk1 and a second advance amount Apk2 are determined on the basis of the determined advance amount Apk. The first advance amount Apk1 is set correspondingly to a case where primary phase advance compensation which will be described later is performed, and the second advance amount Apk2 is set corresponding to a case where secondary phase advance compensation which will be described later is performed. The second advance amount Apk2 is set to ½ of the first advance amount Apk1. The advance amount Apk determined in accordance with each parameter is set so as to correspond to the second advance amount Apk2. The advance amount Apk determined in accordance with each parameter may be set so as to correspond to the first advance amount Apk1. The advance amount Apk is input into the advance amount filter unit 135 from the advance amount determining unit 134.

The advance amount filter unit 135 is provided on the slipstream of the advance amount determining unit 134 and performs filter processing of the advance amount Apk. The advance amount filter unit 135 is provided as above in view of the arrangement in the signal path. The advance amount filter unit 135 is specifically a low-pass filter unit and is constituted by a primary low-pass filter, for example.

The advance amount filter unit 135 constitutes a gain moderation unit which performs moderation of a change in the gain G of the phase advance compensation according to the determination of on/off of the phase advance compensation by executing filter processing of the advance amount Apk when the on/off of the advance compensation is switched. A change amount of the gain G with switching between on/off of the phase advance compensation is suppressed by performing the moderation of the change in the gain G.

The advance amount Apk is input from the advance amount filter unit 135 into the first phase advance compensator 136, the second phase advance compensator 137, and the switch unit 138. The peak value frequency Fpk is also input from the peak value frequency determining unit 141 into the first phase advance compensator 136 and the second phase advance compensator 137.

The first phase advance compensator 136 and the second phase advance compensator 137 both perform the primary phase advance compensation of the feedback primary instructed pressure Ppri_FB on the basis of the input advance amount Apk and further the input peak value frequency Fpk. By performing the phase advance compensation of the feedback primary instructed pressure Ppri_FB, the phase advance compensation of the feedback shift control of the transmission 4 is performed. The first phase advance compensator 136 and the second phase advance compensator 137 are specifically constituted by primary filters and perform the primary phase advance compensation of the feedback primary instructed pressure Ppri_FB by performing the filter processing according to the input advance amount Apk and further the input peak value frequency Fpk.

The second phase advance compensator 137 is provided in series with the first phase advance compensator 136. The second phase advance compensator 137 is provided as above in view of the arrangement in the signal path. The feedback primary instructed pressure Ppri_FB subjected to the primary phase advance compensation by the first phase advance compensator 136 is input into the second phase advance compensator 137.

Therefore, when the primary phase advance compensation of the feedback primary instructed pressure Ppri_FB is performed, the second phase advance compensator 137 further performs the primary phase advance compensation. As a result, the secondary phase advance compensation of the feedback primary instructed pressure Ppri_FB is performed. The second phase advance compensator 137 constitutes an advance compensation unit together with the first phase advance compensator 136.

The switch unit 138 switches between a case where the phase advance compensation is performed by the first phase advance compensator 136 and the second phase advance compensator 137, that is, a case where the second phase advance compensation is performed and a case where the phase advance compensation is performed only by the first phase advance compensator 136, that is, a case where the primary phase advance compensation is performed in accordance with the input advance amount Apk.

That is because an increase in the gain G can be suppressed and the shift control can be prevented from being unstable by performing the secondary phase advance compensation, as compared with the case of performing the primary phase advance compensation. Moreover, that is because, when the advance amount A of the primary phase advance compensation according to the feedback primary instructed pressure Ppri_FB is smaller than a predetermined value A1, a gain suppression effect cannot be expected, while such a situation that the gain G lowers due to a frequency shift and the damping effect is reduced easily can be avoided by performing the primary phase advance compensation. According to one or more embodiments of the present invention, the predetermined value A1 can be set to a minimum value within a range in which the gain suppression effect can be obtained by making the phase advance compensation secondary.

In performing the phase advance compensation as above, the advance amount determining unit 134 and the switch unit 138 are specifically constituted as follows.

That is, when the advance amount A determined in accordance with each parameter is smaller than the predetermined value A1, the advance amount determining unit 134 determines that the primary phase advance compensation is to be performed and determines the advance amount Apk as the first advance amount Apk1. Moreover, when the advance amount A is not smaller than the predetermined value A1, the advance amount determining unit 134 determines that the secondary phase advance compensation is to be performed and determines the advance amount Apk as the second advance amount Apk2. The advance amount A can be set in advance by map data or the like.

When the first advance amount Apk1 is input, the switch unit 138 performs switching so that the phase advance compensation is to be performed only by the first phase advance compensator 136. Moreover, when the second advance amount Apk2 is input, the switch unit 138 performs switching so that the phase advance compensation is performed by the first phase advance compensator 136 and the second phase advance compensator 137.

By configuring as above, the first phase advance compensator 136 and the second phase advance compensator 137 are configured such that the phase advance compensation is performed only by the first phase advance compensator 136 in accordance with the advance amount A. The first phase advance compensator 136 and the second phase advance compensator 137 are configured such that, when the advance amount A is smaller than the predetermined value A1, the phase advance compensation is performed only by the first phase advance compensator 136.

The switch unit 138 may be configured so as to perform the phase advance compensation only by the second phase advance compensator 137 when the primary phase advance compensation is performed. The advance amount determining unit 134 may input the advance amount A instead of the advance amount Apk into the switch unit 138, and the switch unit 138 may perform switching on the basis of the advance amount A input as above. As a result, even if moderation is applied to the first advance amount Apk1 or the second advance amount Apk2, the primary and secondary phase advance compensation can be performed appropriately.

The switch unit 138 constitutes a setting unit adapted to set the feedback primary instructed pressure Ppri_FB subjected to the advance compensation by at least either one of the first phase advance compensator 136 and the second phase advance compensator 137 in accordance with the pulley state value M as the feedback primary instructed pressure Ppri_FB together with the advance compensation on/off determining unit 133. At least either one of the first phase advance compensator 136 and the second phase advance compensator 137 constitute an advance compensation unit adapted to perform advance compensation of the feedback primary instructed pressure Ppri_FB. The feedback primary instructed pressure Ppri_FB subjected to the advance compensation constitutes a feedback command value after the compensation.

Into the actuator 111, the feedback primary instructed pressure Ppri_FB selected by the switch portion 138 and a primary instructed pressure Ppri_FF (a target primary instructed pressure determining a balance thrust or a speed ratio), not shown, set on the basis of the target speed ratio Ratio_D are input. The actuator 111 is a primary pressure control valve which is provided on the hydraulic control circuit 11 and controls the primary pressure Ppri, for example, and controls the primary pressure Ppri so that the actual pressure Ppri_A of the primary pressure Ppri becomes the instructed pressure Ppri_D according to the target speed ratio Ratio_D. As a result, the speed ratio Ratio is controlled so that the actual speed ratio Ratio_A becomes the target speed ratio Ratio_D.

The sensor unit 40 detects the actual speed ratio Ratio_A of the variator 20. The sensor unit 40 is specifically constituted by the rotation speed sensor 42 and the rotation speed sensor 43. The actual speed ratio Ratio_A which is an actual value (sensor value) of the speed ratio detected by the sensor unit 40 is input into the sensor value filter unit 140. The on/off command is also input into the sensor value filter unit 140 through the on/off command filter unit 139. When the advance compensation is on, the on/off command filter unit 139 outputs the on command to the sensor value filter unit 140, and when the advance compensation is off, it outputs the off command to the sensor value filter unit 140. The on/off command filter unit 139 may be omitted.

The sensor value filter unit 140 performs filter processing of the actual speed ratio Ratio_A. In the sensor value filter unit 140, a form of the filter processing is changed in accordance with the on/off command. Specifically, in the sensor value filter unit 140, an order number or execution/stop of the filter processing is switched in accordance with the on/off command. The sensor value filter unit 140 is made a primary low-pass filter when the off command is input, and is made a high-order low-pass filter or stops the filter processing when the on command is input.

By configuring the sensor value filter unit 140 as above, with regard to occurrence of slight delay in a region not higher than a frequency to be removed when the primary low-pass filter is used, the delay is improved when the on command is input. As a result, the phase of the feedback primary instructed pressure Ppri_FB can be further advanced. The sensor value filter unit 140 can be configured by having one or a plurality of primary low-pass filters provided capable of execution/stop of the filter processing or of switching the order number, for example. The actual speed ratio Ratio_A from the sensor value filter unit 140 is input into the FB compensator 132.

The peak value frequency determining unit 141 determines the peak value frequency Fpk of the phase advance compensation. The peak value frequency determining unit 141 changes the peak value frequency Fpk by determining the peak value frequency Fpk in accordance with the speed ratio Ratio. The speed ratio Ratio is specifically made the target speed ratio Ratio_D. Thus, the target speed ratio Ratio_D is input into the peak value frequency determining unit 141 from the target value generating unit 131.

The peak value frequency Fpk determined by the peak value frequency determining unit 141 is input into each of the first phase advance compensator 136 and the second phase advance compensator 137. As a result, the peak value frequency determining unit 141 is configured to set the peak value frequency Fpk for each phase advance compensation performed by the first phase advance compensator 136 and the second phase advance compensator 137 on the basis of the speed ratio Ratio.

In one or more embodiments of the present invention, the control method of the transmission 4 mounted on a vehicle which is a control method of the transmission 4 including performing of the phase advance compensation in the speed ratio control system 100 and making of the advance amount A of the phase advance compensation which is the advance amount A according to the vibration frequency of torsional vibration of the input shaft of the transmission 4, that is, the advance amount A according to the frequency variable in accordance with the operation state of the vehicle is realized.

According to such method, since the phase advance compensation can be performed with the appropriate advance amount A according to the operation state of the vehicle, the damping effect can be obtained while stability of the speed ratio control system 100 is ensured in performing the phase advance compensation.

In the control method of the transmission 4, the FB gain G_FB is variable in accordance with the operation state of the vehicle, and the advance amount A according to the frequency is made variable in accordance with the FB gain G_FB. According to such method, even if the stability of the speed ratio control system 100 is changed in accordance with the FB gain G_FB, the damping effect can be obtained while the stability of the speed ratio control system 100 is ensured.

In the control method of the transmission 4, the transmission 4 includes the variator 20 and makes the advance amount A according to the frequency variable in accordance with the rotation speed Npri. According to such method, the maximum vibration suppression effect can be obtained with respect to the change of the optimal advance amount A as the result of a change in the shift responsiveness in accordance with the rotation speed Npri.

In the control method of the transmission 4, the advance amount A according to the frequency is made variable in accordance with the input torque Tsec transmitted by the transmission 4. According to such method, the maximum vibration suppression effect can be obtained with respect to the change of the optimal advance amount A in accordance with the input torque Tsec. Moreover, the damping effect can be obtained while the stability of the speed ratio control system 100 is ensured with respect to the change of the stability of the speed ratio control system 100 in accordance with the input torque Tsec.

In the control method of the transmission 4, the advance amount A according to the frequency is made variable in accordance with the speed ratio Ratio. According to such method, the maximum vibration suppression effect can be obtained with respect to the change of the optimal advance amount A in accordance with the speed ratio Ratio.

In the control method of the transmission 4, the transmission 4 includes the variator 20 and makes the advance amount A according to the frequency variable in accordance with the secondary pressure Psec. According to such method, the maximum vibration suppression effect can be obtained with respect to the change of the magnitude of the longitudinal vibration in accordance with the secondary pressure Psec.

In the control method of the transmission 4, the advance amount A according to the frequency is made variable in accordance with the oil temperature TMP. According to such method, the maximum vibration suppression effect can be obtained with respect to the change of the hydraulic pressure responsiveness in accordance with the oil temperature TMP.

In the control method of the transmission 4, the advance amount Apk according to the frequency is made variable by making the advance amount Apk at the peak value frequency Fpk variable. According to such method, when the peak value frequency Fpk is set to a targeted frequency and the advance amount A required at the targeted frequency is made the advance amount Apk or the like, it is easy to appropriately make the advance amount A according to the frequency variable and to obtain a desired effect.

Embodiments of the present invention are described above, but the aforementioned embodiments illustrate only a part of an application example of the present invention and are not intended to limit the technical range of the present invention to the specific configuration of the aforementioned embodiments.

In one or more of the aforementioned embodiments, the case where the first phase advance compensator 136 and the second phase advance compensator 137 configure the advance compensation unit was described. However, the primary phase advance compensator may be configured by a single phase advance compensator such as the first phase advance compensator 136 or the second phase advance compensator 137, for example.

Moreover, in one or more of the aforementioned embodiments, the case of use of the FB compensator performing the feedback control of a so-called servo system which performs the feedback control on the basis of the target speed ratio Ratio_D and the actual speed ratio Ratio_A was described. However, not only the feedback control of the servo system but also configuration using the FB compensator which performs the feedback control in accordance with fluctuation of the input torque, for example, may be employed.

In one or more of the aforementioned embodiments, the case where the control method of the continuously variable transmission is realized by the controller 12 was described. However, the control method of the continuously variable transmission may be realized by a plurality of controllers, for example.

In one or more of the aforementioned embodiments, the case where the advance amount A at the targeted frequency is adjusted by making the advance amount Apk at the peak value frequency Fpk variable was described. However, in adjustment of the advance amount A at the targeted frequency, it may be so configured that setting is made so that the most required advance amount A is obtained at the peak value frequency Fpk, while the peak value frequency Fpk is shifted from the targeted frequency as necessary. The shifting of the peak value frequency Fpk from the targeted frequency as above is also included in the making of the advance amount A according to the frequency variable. The shifting of the peak value frequency Fpk from the targeted frequency can be performed by the peak value frequency determining unit 141.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control method of a continuously variable transmission mounted on a vehicle, comprising:
    performing an advance compensation in a speed ratio control system of the continuously variable transmission using an advance amount according to a vibration frequency of torsional vibration of an input shaft of the continuously variable transmission; and
    making the advance amount variable in accordance with a first operation state of the vehicle,
    wherein a feedback gain of speed ratio control of the continuously variable transmission performed in the speed ratio control system is variable in accordance with a second operation state of the vehicle, and
    wherein, when the advance amount is made variable, the advance amount is made variable in accordance with the feedback gain.

2. The control method according to claim 1,
    wherein the continuously variable transmission includes a variator having a primary pulley, a secondary pulley, and a belt extended between the primary pulley and the secondary pulley, and
    wherein the advance amount is made variable in accordance with a rotation speed of the primary pulley.

3. The control method according to claim 1,
    wherein the advance amount is made variable in accordance with a torque transmitted by the continuously variable transmission.

4. The control method according to claim 1,
wherein the advance amount is made variable in accordance with a speed ratio of the continuously variable transmission.

5. The control method according to claim 1,
wherein the continuously variable transmission includes a variator having a primary pulley, a secondary pulley, and a belt extended between the primary pulley and the secondary pulley, and
wherein the advance amount is made variable in accordance with a secondary pressure supplied to the secondary pulley.

6. The control method according to claim 1,
wherein the advance amount is made variable in accordance with an oil temperature of the continuously variable transmission.

7. The control method according to claim 1,
wherein the advance amount is made variable by making the advance amount at a peak value frequency at which the advance amount indicates a peak variable.

* * * * *